May 27, 1969  J. C. SLATTERY ET AL  3,446,068

MICROMETEOROID DETECTOR

Filed Dec. 4, 1967

Bernard Hamermesh
Jack C. Slattery
INVENTORS

BY *Edward [signature]*

AGENT

United States Patent Office 3,446,068
Patented May 27, 1969

3,446,068
MICROMETEOROID DETECTOR
Jack C. Slattery, Panorama City, and Bernard Hamermesh, Los Angeles, Calif., assignors to TRW Inc., Redondo Beach, Calif., a corporation of Ohio
Filed Dec. 4, 1967, Ser. No. 687,897
Int. Cl. G01w 1/00
U.S. Cl. 73—170                           8 Claims

ABSTRACT OF THE DISCLOSURE

This invention is directed to the type of micrometeoroid detector which utilizes a plurality of pressurized containers having a skin that can be punctured by meteoroids. Each of the containers is provided with a pressure switch means for completing an electrical circuit when the pressure in the respective container drops due to the puncture of the container skin by a meteoroid. Fused leads electrically connect each of the pressure switch means to a common electrical terminal. The pressure switch means, when activated, completes the electrical circuit to ground for the container that is punctured. A single lead electrically connects the common electrical terminal to a counter which registers a count each time a pressure switch means completes the electrical circuit. A power source is connected to the common electrical terminal and ground to provide a current of such a magnitude as to cause the fused line connected to a punctured container to electrically open, thereby opening the electrical circuit to ground and enabling the counter to count subsequent punctures of the remaining containers.

Background of the invention

This invention pertains to the field of meteoroid detectors and, more particularly, to a micrometeoroid detector, which can detect the presence of large numbers of meteoroids while utilizing a simplified circuit that achieves a considerable savings in total weight.

One of the most common types of meteoroid detectors used in satellite and spacecraft experiments is the pressurized "can." This type of detector can take many shapes and sizes, but basically it is a thin-skinned container which is pressurized internally to some nominal gas pressure. When the skin is punctured in outer space by a meteoroid "hit," the gas leaks out and when the pressure falls to a low enough value, a pressure sensor is triggered. A meteoroid hit is thus indicated by the change in state of the pressure sensor. However, once a particular can or module is punctured, it will not indicate any further "hits," and the total area of the meteoroid experiments, which consists of many of these modules, decreases with each hit. As the area is decreased, so is the counting rate of the experiment. An obvious solution to this problem is to make each module with a small area and to use more of the modules in an array to obtain the large total area which is necessary for the experiment.

There are certain objections to this course of action. In the first place, each module has a separate wire running from its pressure sensor back to the spacecraft control circuitry. Since the number of wires goes up linearly with the number of modules, they can add considerably to the total weight. The complexity of the puncture sensing circuitry in the spacecraft is also increased. The sensing circuitry must now examine a large number of sensors and it must also remember on each examination cycle which sensors indicated a hit upon the previous cycle and which are indicating a hit for the first time.

This invention is, therefore, directed to a detector arrangement which eliminates most of the wires and reduces considerably the complexity of the sensing circuitry. This makes feasible, detectors with a large number of separate modules. Each module can then have a relatively small area and while a hit or puncture still removes that area from the total area, the effect is much less serious.

Summary of the invention

In a preferred embodiment of the invention, a plurality of pressurized containers are affixed to a surface of a space vehicle. The skin of the containers is made thin enough to enable puncturing by micrometeoroids. A plurality of pressure switch means, each responsive to the pressure in one of the plurality of containers, completes an electrical circuit when the pressure in the respective container drops due to the puncture of the container skin by a meteoroid. A plurality of fused lines are electrically connected to a common electrical terminal. The plurality of pressure switch means each connect one fused line to ground when a loss in pressure occurs in a respective container. A single electrical lead connects the common terminal to a counter which detects each completion of an electrical circuit and also to a power source which provides a current of such a magnitude as to cause the fused line connected to a punctured container to electrically open. The opening of the fused line restores the open condition in the electrical circuits and effectively resets the counter for the next registration of a meteor hit.

Accordingly, it is an object of the present invention to provide an improved micrometeoroid detector.

It is a further object of the present invention to provide a lightweight, relatively simplified meteoroid detector.

It is another object of the present invention to provide a micrometeoroid detector which is capable of counting a large number of micrometeoroid hits.

The aforementioned and other objects of the present invention will become more apparent and better understood when taken in conjunction with the following description and drawings, throughout which like characters indicate like parts, and which drawings form a part of this application.

Brief description of the preferred embodiment

Figure 1:
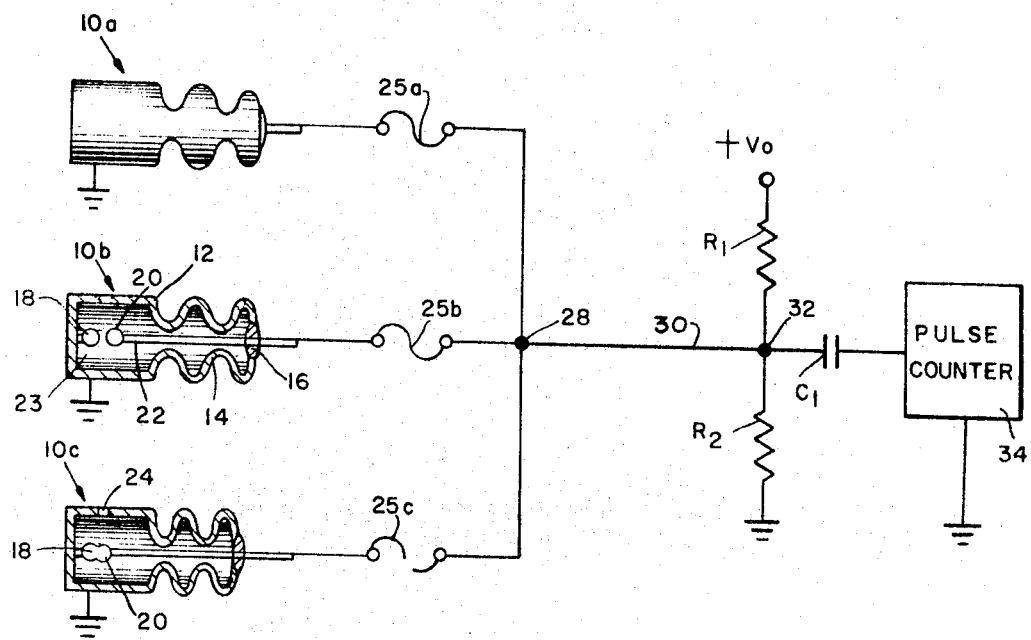
FIGURE 1 illustrates in block diagram form the preferred embodiment of the invention.

Referring to FIGURE 1, the plurality of pressurizable containers are numbered 10a, 10b and 10c; although three containers are shown, these are for purposes of illustration only, and the number of containers used is limited only by the requirements of the particular mission. The wall portion 12 of the containers is preferably made from a thin skin of conductive material. A portion of the skin 12 is crimped at one end to form a bellows type structure 14 which expands under pressure and springs back to its normal state when the pressure is released. Passing through the wall of the container and forming a pressure-tight seal therewith is a dielectric member 16. A conductive rod 22 passes through the center of the dielectric member 16 and is normally insulated from the conductive wall sections 12. An electrical contact 20 is connected to the end of rod 22. A similar electrical contact 18 is connected to the conductive wall portion 12. The wall portion 12 is electrically connected to some common point such as ground. In the unenergized, or unpressurized condition, contact 18 touches contact 20. A gas 23 is pumped into the container 10, causing the bellows portion 14 to expand, pushing the contact 20 away from the contact 18. A fuse line 25 connects each of the canisters via the conductive rod 22 to a common electrical terminal 28. The common terminal 28 is physically placed as close to the containers 10 as possible. A single lead wire 30 connects the common terminal 28 to a second electrical terminal 32. Terminal 32 is positioned in close proximity to the source of power $+V_0$ and the pulse counter 34.

A resistor $R_1$ connects the power source $+V_0$ to the junction 32. A second resistor $R_2$ connectors the junction 32 to the common point or ground. A capacitor $C_1$ connects the terminal point 32 to the input of a pulse counter 34. The pulse counter has its input electrically referenced with respect to the common point, ground.

Figure 2:
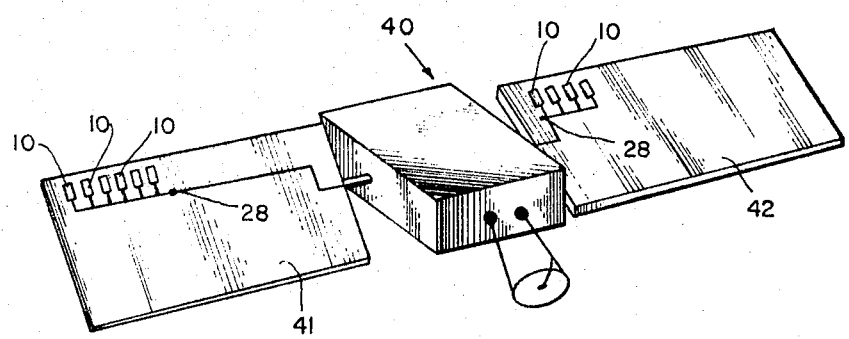
FIGURE 2 illustrates the embodiment of FIGURE 1 mounted in operating position on a spacecraft.

In FIGURE 2, there is shown a typical application of the detector. A plurality of canisters 10 are mounted in a conductive manner to the surfaces of large paddle wheels 41 and 42 which are part of the satellite 40. Each of the containers 10 are electrically connected together through their respective rods 22 and fused lines 25 to the common point 28. The length and weight of the wires necessary to connect each one of the canisters to the common point 28 is kept to a minimum value.

In operation, referring back to FIGURE 1, a micrometeoroid pierces the thin skin of the container 10c, causing an opening 24 to be formed which allows the gas 23 to escape. As the gas escapes, the bellows 14 contracts under the normal spring action of the metal and electrical contacts 18 and 20 come together, electrically connecting the common terminal 28 to ground. This in turn causes the potential at terminal 32 to fall to the ground level. A voltage pulse of magnitude $R_2V_0(R_1+R_2)$ appears across capacitor $C_1$ and is transmitted to the input of the pulse counter 34. Current also starts to flow through the fuse 25c leading into the container having the short. The current is equal to $V_0/R_1$ and is selected to be of a sufficient value to cause the fuse to open as shown. When the fuse opens, the voltage at terminal 32 rises back to its original value of $R_2V_0/(R_1+R_2)$ and the circuit is ready to register the next hit by a meteoroid.

The pressure switch means is shown as a two-terminal switch consisting of contacts 18 and 20. It will be obvious to those persons skilled in the art that other electrical pressure sensors may be used effectively with this detector without detracting from its novelty.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as may fall within the true scope of the invention.

What is claimed is:
1. A meteoroid detector comprising in combination:
   a plurality of pressurized cans;
   a plurality of pressure switch means, one pressure switch means responsive to the pressure in one can and switching from an electrical open to an electrical closed condition when the pressure in said one can drops due to the puncture of said one can by a meteoroid;
   a common electrical terminal;
   a plurality of fused lines, each of said fused lines connecting one of said switch means to said common electrical terminal;
   a pulse counter for counting changes in voltage and current;
   an electrical line connecting the input of said pulse counter to said common terminal; and
   a voltage source connected to said common terminal to provide a current, when one of said switch means is closed, of such a magnitude as to open the fuse in said fused line.
2. A meteoroid detector for a space vehicle comprising in combination:
   a space vehicle having a frame member;
   an array of pressurized containers mounted on said frame member, each of said containers having a pressure switch which closes when the pressure in said container falls below a minimum value;
   a common electrical terminal;
   a plurality of fused lines, each connecting a pressure switch to said common electrical terminal;
   a source of power for providing a current of a sufficient magnitude to open the fuse which is connected to a closed pressure switch;
   a lead connecting said common terminal to said source of power;
   a lead connecting said power source to said pressure switch; and
   means for counting the number of pressure switches closed.
3. The invention, according to claim 2, wherein said pressurized containers are formed of a thin-skinned conductive material.
4. The invention, according to claim 2, wherein said source of power is comprised of a potential source;
   a first resistor connecting said potential source to said common lead; and
   a second resistor connecting said common lead to ground.
5. The invention, according to claim 4, and further comprising a capacitor connecting said means for counting to said common lead.
6. A meteoroid detector comprising in combination:
   a plurality of pressurized cans, each of said cans having a bellows portion which expands and contracts under the influence of the pressure within said can;
   a first electrical contact movable with said bellows portion;
   a second electrical contact positioned to contact said first electrical contact when the pressure within said container falls below a preset value, each of said second electrical contacts connected together;
   a common electrical terminal;
   a plurality of fused lines, each connecting one of said first electrical contacts to said common electrical terminal;
   a source of power for providing a current of sufficient magnitude to open the fuse connected to a line in which said first and second electrical contacts have completed a circuit, said source of power electrically connected across said common electrical terminal and said second electrical contacts; and
   means for detecting the contact of a first and second electrical contact.
7. The invention, according to claim 6, wherein said source of power is comprised of:
   a potential source;
   a first resistor connecting said potential source to said common electrical terminal; and
   a second resistor connecting said common electrical terminal to said second electrical contacts.
8. The invention, according to claim 6, and further comprising a capacitor connecting said common electrical terminal to the input of said detecting means.

References Cited

UNITED STATES PATENTS 3,238,774   3/1966   Gurtler _____ 73—170
3,278,704   10/1966  Smith _____ 200—83

JAMES J. GILL, *Primary Examiner.*

J. WHALEN, *Assistant Examiner.*

U.S. Cl. X.R.

73—12, 432; 340—201